Jan. 1, 1924
W. VAN GUILDER
GALVANOMETER
Filed Aug. 26, 1921
1,479,524
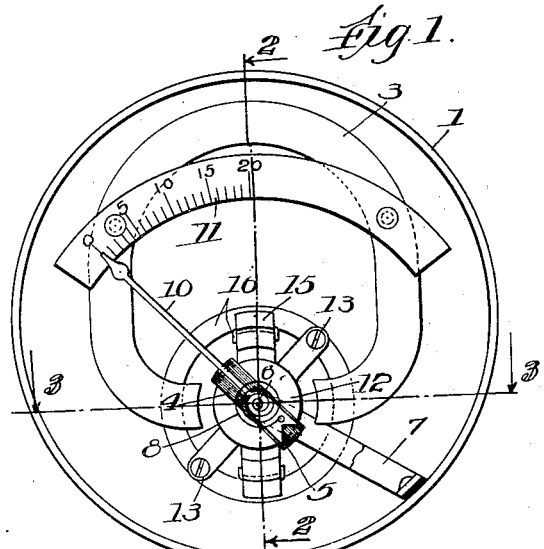
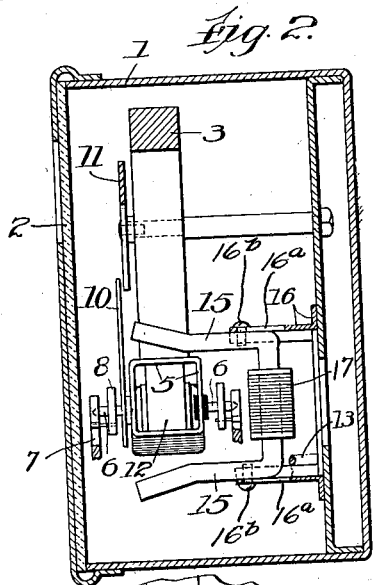
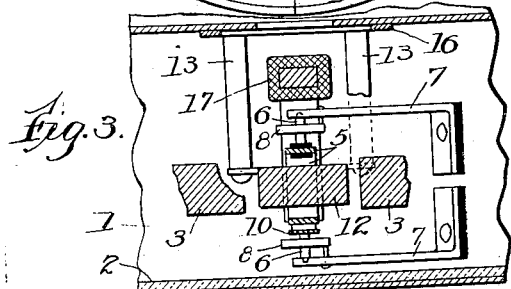
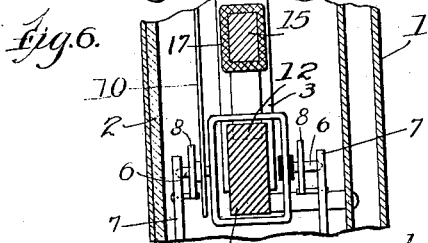
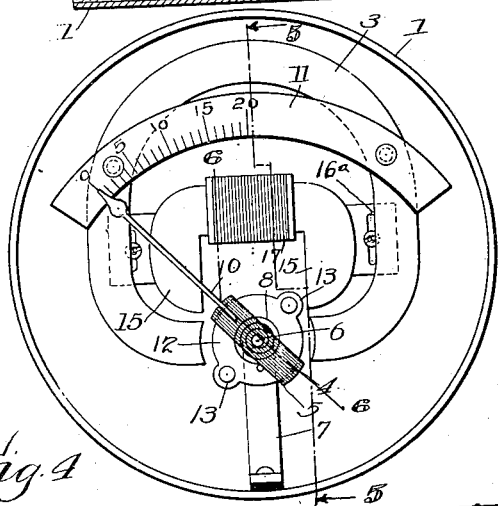
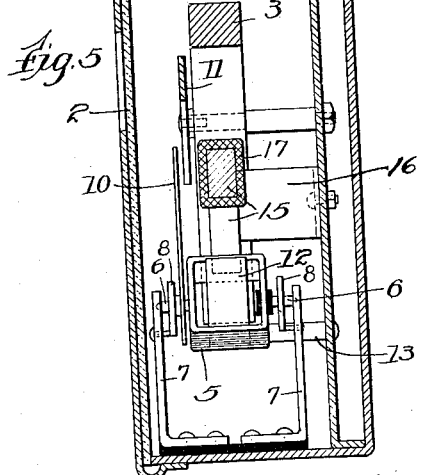
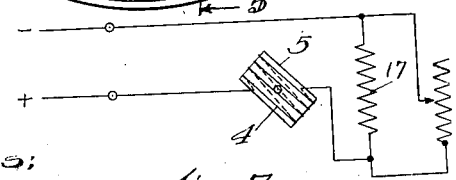
Inventor:
Walter Van Guilder,
by Burton & Burton
his Attys.
Witness:

Patented Jan. 1, 1924.

1,479,524

UNITED STATES PATENT OFFICE.

WALTER VAN GUILDER, OF CHICAGO, ILLINOIS, ASSIGNOR TO STEWART-WARNER SPEEDOMETER CORPORATION, OF CHICAGO, ILLINOIS, A CORPORATION OF VIRGINIA.

GALVANOMETER.

Application filed August 26, 1921. Serial No. 495,617.

*To all whom it may concern:*

Be it known that I, WALTER VAN GUILDER, a citizen of the United States, residing at Chicago, in the county of Cook and the State of Illinois, have invented certain new and useful Improvements in Galvanometers, of which the following is a specification, reference being had to the accompanying drawings, forming a part thereof.

The purpose of this invention is to provide an improved construction of an electric gauge device of the general type of a galvanometer compensated for variations of voltage of the current to be indicated. It consists in the elements and features of construction shown and described as indicated in the claims.

In the drawings:—

Figure 1 is a plan view of an instrument embodying this invention.

Figure 2 is a section at the line 2—2 on Figure 1.

Figure 3 is a section at the line 3—3 on Figure 1, with the galvanometer coil at the position of maximum indication.

Figure 4 is a plan view of a similar instrument of modified construction.

Figure 5 is a section at the line 5—5 on Figure 4.

Figure 6 is a section at the line 6—6 on Figure 4.

Figure 7 is a wiring diagram applicable to either of the two forms shown in the preceding figures.

The construction shown in Figures 1, 2 and 3 of the drawings comprises a casing 1, having an open end closed by transparent pane or crystal, 2, said casing constituting a mounting for the operating parts, which comprise a permanent magnet, 3, of split-ring or horse-shoe type, which is mounted fixedly in any convenient manner within the casing, being the usual permanent magnet of a galvanometer. The galvanometer coil, 4, is mounted for oscillation as required in the usual operation of a galvanometer, being for that purpose coiled around the four-sided frame, 5, which is provided with pintles, 6, 6, forming the pivots by which it is mounted for oscillation on a U-shaped bracket, 7, secured to one side wall of the casing in suitable position to permit the oscillation of the coil in the plane of the galvanometer magnet. Biasing springs, 8, 8, are attached at their inner ends to the pintles, 6, 6, and at their outer ends to the casing, for biasing the coil to the position of minimum indication shown in Figure 1, at which the plane or planes of the galvanometer coils are oblique to the path of the flux from pole to pole of the permanent magnet; so that when the coil is energized by the electric current the resulting tendency of the coil to position itself at right angles to the flux path, causes its oscillation from said position of minimum indication, against the resistance of the biasing springs, 8, 8; whereby the index hand, 10, secured to one of the pintles is operated over the index dial, 11, away from the zero position, its said deflection being proportioned in amount of current passing through the galvanometer coil according to the familiar principle of a galvanometer.

For concentrating the magnetic flux passing between the poles of the galvanometer magnet, there is mounted fixedly on the casing a soft iron concentrating armature, 12, which as shown is substantially cylindrical about the axis of oscillation of the galvanometer coil and supported by bracket arms, 13, extending to the back or bottom of the casing at positions at opposite sides of the axis where they do not interfere with the swinging of the frame, 5.

The particular purpose for which this device is intended is as a gauge to be operated for indicating the depth of liquid in a tank, the gauge being situated at a distance from the tank, any suitable means being associated with the tank for varying the current which energizes the galvanometer according to the depth of liquid in the tank. A depth gauge of this general character is shown in my pending application 449,374, filed March 3, 1921 and now pending in the United States Patent Office, particularly designed for indicating the depth of liquid fuel in the fuel supply tank of an automobile, the gauge being mounted on the dash or instrument board of the vehicle and therefore at a considerable distance from the fuel supply tank which is at the rear of the vehicle. When applied to such a purpose, the electric current for the galvanometer is derived from a storage battery or other source of electric current employed for other purposes about the vehicle, and such battery is liable to very considerable change of voltage from time to time according to the demand made upon it for such other purposes. In the absence of means to prevent it, this change of voltage is reflected in the galvanometer reading; so that the same depth of liquid in the tank would cause very considerable difference in indication at the gauge, according to the different voltage of the current derived from the storage battery at different times. To render such a device practical and acceptable for this purpose, it is obviously necessary to compensate for this change of voltage. This is the specific purpose of the present invention, and this purpose is accomplished by the means which will now be described.

15, is an electro-magnet mounted upon the casing by any convenient means as by the brackets, 16, said electro-magnet being preferably in horse-shoe form with its two arms extending into proximity with the path of the flux between the poles of the permanent magnet, 3, the electro-magnet coil is in circuit with the galvanometer coil, as may be understood from Figure 7. Unless as in Figure 1 the electro-magnet poles are each equally distant from the two poles of the galvanometer magnet, the coil is wound on the electro-magnet in the direction to make the north pole of the electro-magnet adjacent to the south pole of the permanent magnet and the south pole of the electro-magnet adjacent to the north pole of the permanent magnet. With this construction it will be seen that the electro-magnet is adapted to operate as a shunt or bypass for the flux of the permanent magnet reflecting said permanent magnet flux out of its normal path between the two poles of the permanent magnet, thereby diminishing the flux which influences the galvanometer coil for causing its deflection against the biasing spring. In the construction shown in Figures 1 and 2, in order that the effect may be obtained to the full extent of the deflection of the flux through the electro-magnet, it is necessary that the arms of the electro-magnet should be positioned so that the path of the magnetic flux therein shall be substantially parallel to the planes of the winding of the galvanometer coil or else shall be so remote therefrom as to have only negligible effect upon the galvanometer coil. In the form shown in Figures 1 and 2, the electromagnet has its arms parallel to the axis of oscillation of the galvanometer coil and said arms are thereby parallel to the planes of the galvanometer coil at all positions in the range of oscillation of said coil. The electromagnet in this form is so dimensioned that its yoke, which forms a part of the path of the flux is distant from the galvanometer coil so far that the effect of the flux passing through said yoke is negligible.

In the form shown in Figures 4, 5 and 6, the electromagnet is differently positioned, being in the same plane as the permanent magnet and with its pole arms extending in the same direction from its yoke. In this form, the path of the flux from the permanent magnet to and through the pole arms of the electromagnet is not parallel to the planes of winding of the galvanometer coil; but said flux path in the pole arms of the electromagnet is in such oblique direction with respect to the planes of the galvanometer coil that it tends to oppose the action of the direct flux passing between the poles of the permanent magnet; that is, the tendency of the flux in its path through the pole arms of the electromagnet is to deflect the galvanometer coil in the opposite direction from that in which it is deflected by the flux passing directly between the poles of the galvanometer permanent magnet; and by properly dimensioning the poles and the inter-polar spaces the compensation for change of voltage is obtained in this form, substantially as fully as in the form shown in the earlier figures.

Since it is practically impossible to produce permanent magnets of identical strength, even though of identical dimensions and identically treated for magnetizing, it is necessary to provide means for calibrating each instrument to properly relate the proportion of flux deflected to the total flux of the permanent magnet and to the number of coils of the galvanometer and the tension of the biasing springs. The most convenient means for such calibration consists in mounting the electromagnet so that it shall be adjustable to vary the proximity of its poles to the flux-path of the permanent magnet. In the form shown in Figures 1 and 2 this is effected by slotting the bracket, 16, by which the electromagnet is mounted as seen at 16$^a$, so that the securing screws, 16$^b$, by which the electromagnet is held to the bracket, may be moved along in the slots to carry the electromagnet yoke directly toward and from the plane of the permanent magnet, causing its pole arms to be thrust in the direction of their extent past the opposite sides of the armature, 12, which occupies the gap of the permanent magnet for concentrating the flux; the electromagnet poles are deflected so as to present oblique faces to the armature; with the result that the adjustment of the electromagnet described varies the degree of approximation of the electromagnet poles to the proximate surfaces of the armature and thereby varies the amount of flux deflected by the electromagnet. In the form shown in Figures 4 and 5, the electromagnet is similarly mounted for sliding its securing screws along slots, 16ª, in the supporting bracket, 16, and this sliding directly varies the distance between the electromagnet poles and the permanent magnet poles.

I claim:—

1. In combination with the permanent magnet and biased coil of a galvanometer, an electromagnet, whose coil is in circuit with the galvanometer coil and whose magnetized core is positioned with respect to the galvanometer coil and magnet poles for deflecting the flux of the permanent magnet out of the path for influencing the galvanometer coil, whereby variations of voltage of the current are compensated and prevented from affecting the galvanometer reading.

2. In the construction defined in claim 1, foregoing, an armature in the permanent magnet gap for concentrating the magnetic flux subject to the deflection produced by the electromagnet.

3. In the construction defined in claim 1, the electromagnet being of horse-shoe or U-type with its poles adjacent respectively to the oppositely named poles of the permanent magnet and its arms in which lies the path of the flux parallel to the axis of oscillation of the galvanometer coil, said galvanometer coil being wound in planes parallel to said axis; whereby at all positions in the oscillation of the galvanometer coil, it is parallel to the path of the flux in the electromagnet pole arms.

4. In the construction defined in claim 1, foregoing, means by which the electromagnet is mounted movably for adjustment to vary the degree of proximity of its poles respectively to the direct flux path of the permanent magnet.

In testimony whereof, I have hereunto set my hand at Chicago, Illinois, this 22d day of August, 1921.

WALTER VAN GUILDER.